United States Patent
Wang

(10) Patent No.: US 8,443,149 B2
(45) Date of Patent: May 14, 2013

(54) EVICTING DATA FROM A CACHE VIA A BATCH FILE

(75) Inventor: Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 12/873,763

(22) Filed: Sep. 1, 2010

(65) Prior Publication Data

US 2012/0054444 A1    Mar. 1, 2012

(51) Int. Cl.
*G06F 13/00* (2006.01)
*G06F 13/28* (2006.01)
*G06F 7/00* (2006.01)
*G06F 17/00* (2006.01)

(52) U.S. Cl.
USPC ............ 711/133; 711/118; 711/119; 711/135; 711/136; 711/141; 707/610; 707/614; 707/615

(58) Field of Classification Search ........................ None
See application file for complete search history.

(56) References Cited

U.S. PATENT DOCUMENTS

| | | | |
|---|---|---|---|
| 7,085,895 B2 * | 8/2006 | Kishi ............................. | 711/135 |
| 7,181,457 B2 * | 2/2007 | Reinauer et al. ...................... | 1/1 |
| 7,395,279 B2 * | 7/2008 | Iyengar et al. ......................... | 1/1 |
| 7,809,882 B1 * | 10/2010 | Liu et al. ...................... | 711/113 |
| 2009/0198899 A1 * | 8/2009 | Revanuru ...................... | 711/128 |

* cited by examiner

*Primary Examiner* — Matthew Bradley
*Assistant Examiner* — Rocio Del Mar Perez-Velez
(74) *Attorney, Agent, or Firm* — Owen J. Gamon

(57) ABSTRACT

In an embodiment, a plurality of keys are evicted from a first cache at a primary server. A first key is evicted from the first cache because the first key satisfied a first evict policy during a first time range. A second key is evicted from the first cache because the second key satisfied the first evict policy during a second time range, but the second key did not satisfy the first evict policy during the first time range. The plurality of keys are added to a batch file. If the batch file is full, the batch file is sent to a replica server, and the batch file requests the replica server to evict the plurality of keys from a second cache at the replica server. If the batch file is not full, the batch file is not sent to the replica server.

15 Claims, 7 Drawing Sheets

| | | | | |
|---|---|---|---|---|
| | 152 CACHE | | | |
| 310 | 312 | 314 | 316 | |
| KEY | DATA | TIMESTAMP | USAGE FREQUENCY | |
| STATE = MINNESOTA | ROCHESTER, MINNEAPOLIS, ORONOCO | 1:01 | 2 | 302 |
| CITY = ROCHESTER | 55901, 55902, 55903, 55904 | 1:02 | 15 | 304 |
| STATE = WISCONSIN | MADISON, EU CLAIRE, HUDSON | 1:04 | 40 | 306 |
| | | | | 308 |

FIG. 3

US 8,443,149 B2

EVICTING DATA FROM A CACHE VIA A BATCH FILE

FIELD

An embodiment of the invention generally relates to computer systems and more particularly to evicting data from a computer system cache.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data. One mechanism for managing data is called a database management system (DBMS), which may also be called a database system or simply a database.

Many different types of databases are known, but the most common is usually called a relational database (RDB), which organizes data in tables that have rows, which represent individual entries, tuples, or records in the database, and columns, fields, or attributes, which define what is stored in each row, entry, tuple, or record. Each table has a unique name within the database and each column has a unique name within the particular table. The database also has an index, which is a data structure that informs the database management system of the location of a certain row in a table given an indexed column value, analogous to a book index informing the reader on which page a given word appears. The database accesses the data in a row via a key. A key specifies the name of a column and a data value that exists in one of the rows in that column.

Data in databases is often replicated on multiple server computers, in order to provide enhanced performance, reliability, and to provide the ability to respond to a variable rate of requests from client computers. For example, an online store may have several servers, each of which may include replicated data regarding the inventory that is in stock and available for sale. Some replicated databases replicate the entire database while others replicate only a portion of the data and store the replicated data in volatile memory, such as a cache, as opposed to storing the replicated data in non-volatile memory, such as a disk drive or other secondary storage. Databases that primarily rely on volatile memory are known as in-memory databases (IMDB) or main memory databases (MMDB). Accessing data from a cache typically provides faster and more predictable performance than does secondary storage.

Data that is replicated in multiple caches needs to be kept synchronized or consistent. For example, if a client buys an inventory item via a request to one server, the inventory data at that server is easily decremented, in order to reflect that the number of items in stock has decreased by one. But, the inventory data at the other servers is now out-of-date or "stale" and also needs to be decremented, in order to keep the replicated data across all servers synchronized and up-to-date. The process of keeping multiple caches synchronized is often called cache coherency.

SUMMARY

A method, computer-readable storage medium, and computer system are provided. In an embodiment, a plurality of keys are evicted from a first cache at a primary server. A first key is evicted from the first cache because the first key satisfied a first evict policy during a first time range. A second key is evicted from the first cache because the second key satisfied the first evict policy during a second time range, but the second key did not satisfy the first evict policy during the first time range. The plurality of keys are added to a batch file. If the batch file is full, the batch file is sent to a replica server, and the batch file requests the replica server to evict the plurality of keys from a second cache at the replica server. If the batch file is not full, the batch file is not sent to the replica server.

BRIEF DESCRIPTION OF THE SEVERAL VIEWS OF THE DRAWINGS

FIG. 3 depicts a block diagram of an example data structure for a cache, according to an embodiment of the invention.

It is to be noted, however, that the appended drawings illustrate only example embodiments of the invention, and are therefore not considered a limitation of its scope, for the invention may admit to other equally effective embodiments.

DETAILED DESCRIPTION

Figure 1:
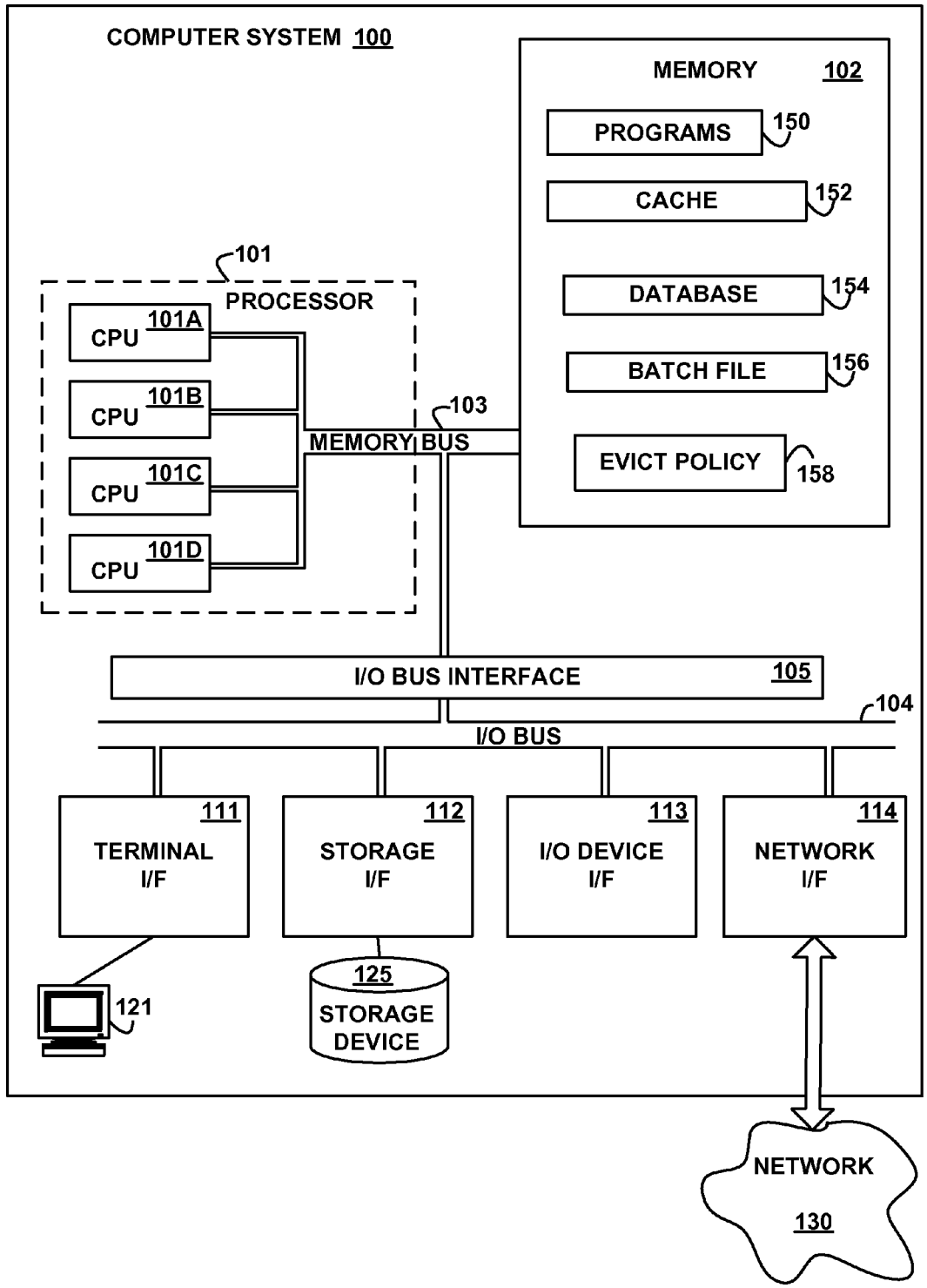
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. The major components of the computer system 100 include one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes programs 150, a cache 152, a database 154, a batch file 156, and an evict policy 158. Although the programs 150, the cache 152, the database 154, the batch file 156, and the evict policy 158 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the programs 150, the cache 152, the database 154, the batch file 156, and the evict policy 158 are illustrated as being contained within the main memory 102, these elements are not necessarily all completely contained in the same storage device at the same time. Further, although the programs 150, the cache 152, the database 154, the batch file 156, and the evict policy 158 are illustrated as being separate entities, in other embodiments some of them, portions of some of them, or all of them may be packaged together.

In various embodiments, the programs 150 comprise programs, methods, procedures, routines, classes, objects, instructions, or statements that execute on the processor 101 or that are interpreted by instructions or statements that execute on the processor 101, to carry out the functions as further described below with reference to FIGS. 2, 3, 4, 5, 6, and 7. In another embodiment, the programs 150 are implemented in hardware via semiconductor devices, chips, logical gates, circuits, circuit cards, and/or other physical hardware devices in lieu of, or in addition to, a processor-based system.

The cache 152 stores a subset of the keys and data from the database 154, and the cache 152 is smaller than and stores fewer keys and data values than does the database 154. The cache 152 comprises keys, data, the time at which the keys and data were most recently accessed (read or written) from the cache 152 and a usage frequency of the number of times that the key and data were accessed. If data requested by the programs 150 at the computer 100 (or requested by another computer) is contained in the cache 152 (an occurrence known as a cache hit), the programs 150 read the data from the cache 152, which is faster than reading the data from the database 154. If the data requested by the programs 150 at the computer 100 (or requested by another computer) is not contained in the cache 152 (an occurrence known as a cache miss), the programs 150 read the data from the database 154, which is slower than reading the data from the cache 152. The data read from the database 154 (including a key and value) is cached in a local cache and an access count and frequency are updated. During a cache miss, an entry is evicted or deleted from the cache 152, in order to make room for the previously un-cached data. Entries may also be evicted from the cache 152 at other times. The evict policy 158 specifies the heuristic that the programs 150 use to select the entry to evict from the cache 152. The evict policy 158 is also known as the eviction policy or the replacement policy. Examples of the heuristic specified by the evict policy 158 include the Least Recently Used (LRU) heuristic, the Most Recently Used (MRU) heuristic, the Least Frequently Used (LFU) heuristic, the Adaptive Replacement Cache (ARC) heuristic, and the Time to Live (TTL) heuristic. But, in other embodiments, any appropriate heuristic may be used to evict entries from the cache 152.

The LRU heuristic evicts the least recently used items first from the cache 152. The MRU heuristic evicts the most recently used items first from the cache 152. The LFU heuristic counts how often a data item is accessed from the cache 152 and evicts first those data items that are accessed least often. The ARC heuristic combines the LRU and LFU heuristics. The TTL heuristic evicts an entry when the time since the item was added to the cache 152 or the time since the item was last accessed (read or written) exceeds a threshold amount of time.

In an embodiment, the database 154 is a relational database, but in other embodiments the database 154 may be implemented as any type of data repository that is capable of uniquely identifying data via a key or other identifier. The batch file 156 comprises keys that have been evicted from the cache 152 at the computer system 100 but have not yet been evicted from the caches at other computer systems. In various embodiments, the batch file 156 may be implemented as a file, command, request, record, data structure, data stream, object, or any other appropriate technique for storing and/or sending information. In response to the batch file 156 becoming full of evicted keys, the computer system 100 sends the batch file 156 to other computer systems, which evict the keys specified by the batch file 156 from their respective caches.

The memory bus 103 provides a data communication path for transferring data between the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices. For example, the terminal interface unit 111 supports the attachment of one or more user input/output devices 121, which may include user output devices (such as a video display device, speaker, printer, and/or television set) and user input devices (such as a keyboard, mouse, keypad, touchpad, trackball, buttons, light pen, or other pointing device). A user may manipulate the user input devices, in order to provide input to the user input/output device 121 and the computer system 100 via a user interface, and may receive output via the user output devices. For example, a user interface may be presented via the user input/output device 121, such as displayed on a display device, played via a speaker, or printed via a printer.

The storage interface unit 112 supports the attachment of one or more direct access storage devices (DASD) 125 (which are typically rotating magnetic disk drive storage devices, although they could alternatively be other devices, including arrays of disk drives configured to appear as a single large storage device to a host). In another embodiment, the devices 125 may be implemented via any type of secondary storage device. The contents of the main memory 102, or any portion thereof, may be stored to and retrieved from the direct access storage devices 125, as needed.

The I/O device interface 113 provides an interface to any of various other input/output devices or devices of other types, such as printers or fax machines. The network adapter 114 provides one or more communications paths from the computer system 100 to other digital devices and computer systems; such paths may include, e.g., one or more networks 130. Although the memory bus 103 is shown in FIG. 1 as a relatively simple, single bus structure providing a direct communication path between the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user mainframe computer system, a single-user system, or a server or similar device that has little or no direct user interface, but receives requests from other computer systems (clients). In other embodiments, the computer system 100 may be implemented as a desktop computer, portable computer, laptop or notebook computer, tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network, cell-based radio network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100 and the network 130, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention.

As will be appreciated by one skilled in the art, aspects of embodiments of the present invention may be embodied as a system, method, or computer program product. Accordingly, aspects of embodiments of the present invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Furthermore, embodiments of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible non-transitory medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency (RF), or any suitable combination of the foregoing. Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to a computer system via a variety of tangible computer-readable storage media that may be operatively or communicatively connected (directly or indirectly) to the processor or processors.

The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks. The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
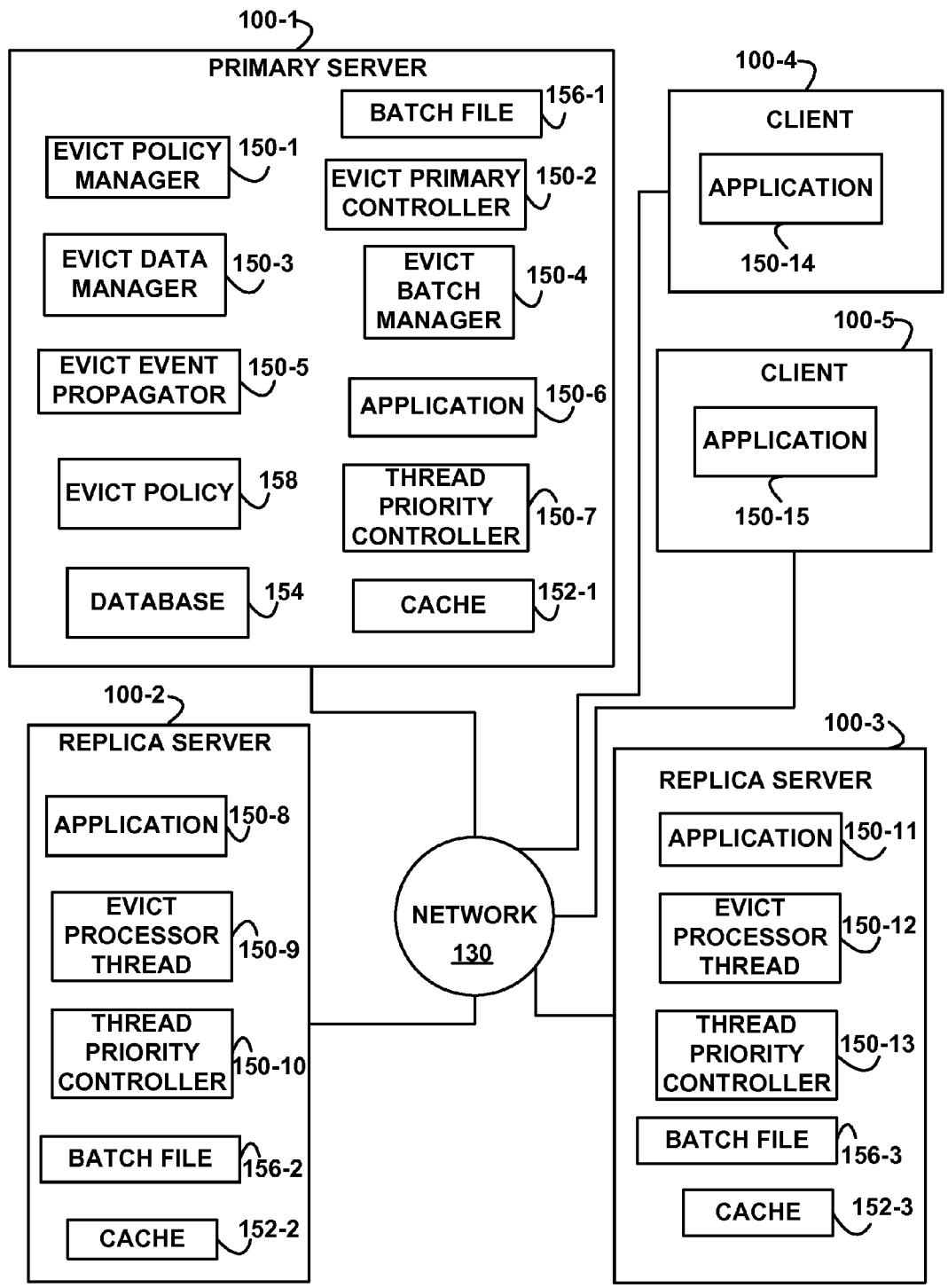
FIG. 2 depicts a block diagram illustrating primary and replica server computer systems connected to client computer systems via a network, according to an embodiment of the invention.

FIG. 2 depicts a block diagram illustrating a primary server computer 100-1, replica server computers 100-2 and 100-3, and client computers 100-4 and 100-5 connected via a network 130, according to an embodiment of the invention. The computers 100-1, 100-2, 100-3, 100-4, and 100-5 are examples of, and are generically referred to by, the computer system 100 (FIG. 1). The computers 100-1, 100-2, 100-3, 100-4, and 100-5 may include some or all of the hardware and program elements previously described above with reference to FIG. 1 and may include the same or different combinations of the hardware and program elements.

The primary server computer system 100-1 comprises an evict policy manager 150-1, an evict primary controller 150-2, an evict data manager 150-3, an evict batch manager 150-4, an evict event propagator 150-5, an application 150-6, a thread priority controller 150-7, a cache 152-1, a database 154, a batch file 156-1, and an evict policy 158. The replica server 100-2 comprises an application 150-8, an evict processor thread 150-9, a thread priority controller 150-10, a cache 152-2, and a batch file 156-2. The replica server 100-3 comprises an application 150-11, an evict processor thread 150-12, a thread priority controller 150-13, a cache 152-3, and a batch file 156-3. The client computers 100-4 and 100-5 comprise respective applications 150-14 and 150-15.

The evict policy manager 150-1, the evict primary controller 150-2, the evict data manager 150-3, the evict batch manager 150-4, the evict event propagator 150-5, the application 150-6, the thread priority controller 150-7, the application 150-8, the evict processor thread 150-9, the thread priority controller 150-10, the application 150-11, the evict processor thread 150-12, and the thread priority controller 150-13 are examples of, and are generically referred to by, the programs 150 (FIG. 1). The cache 152-1, 152-2, and 152-3 are examples of, and are generically referred to by, the cache 152 (FIG. 1). The batch files 156-1, 156-2, and 156-3 are examples of, and are generically referred to by, the batch file 156 (FIG. 1).

The cache 152-1, 152-2, and 152-2 comprise subsets of, and are less than the full contents of, the database 154. In an embodiment, the full contents of the database 154 is not stored at the replica server computer systems 100-2 and 100-3 or at the client computer systems 100-4 and 100-5. The batch file 156-1 comprises keys that the primary server computer system 100-1 has evicted from the cache 152-1, but which the primary server computer system 100-1 has not yet sent to the replica servers 100-2 and 100-3. The batch files 156-2 and 156-3 comprise keys that the primary server 100-1 has evicted from the cache 152-1 and has sent to the respective replica servers 100-2 and 100-3. In response to receiving the respective batch files 156-2 and 156-3 from the primary server 100-1, the replica servers 100-2 and 100-3 evict the keys specified by the respective batch files 156-2 and 156-3 from the respective caches 152-2 and 152-3.

The client computer systems 100-4 and 100-5 send read and/or write requests to the server computer systems 100-1, 100-2, and/or 100-3, which request the reading and/or writing of data from and/or to the database 154. In response to receiving the read/write requests from the client computer systems 100-4 and 100-5, the server computer systems 100-1, 100-2, and 100-3 read/write data from/to the caches 152-1, 152-2, and/or 152-3 at the respective computer systems 100-1, 100-2, and 100-3 and/or the database 154 at the primary server 100-1.

FIG. 3 depicts a block diagram of an example data structure for a cache 152, according to an embodiment of the invention. The example cache 152 comprises example entries 302, 304, 306, and 308, each of which comprises an example key field 310, a data field 312, a timestamp field 314, and a usage frequency field 316. Although FIG. 3 illustrates the key 310, the data 312, the timestamp 314, and the usage frequency 316 as being contained in the same cache 152, in another embodiment, the key 310 and the data 312 may be in a data table that is separate from the timestamp 314 and the usage frequency 316, which may be implemented as a queue or a sorted tree data structure. Depending on the eviction policy, in various embodiments, both the timestamp 314 and the usage frequency 316 are present and used or only one of the timestamp 314 and usage frequency 316 are present and used.

The example entries 302, 304, and 306 comprise information in the fields 310, 312, 314, and 316 while the example entry 308 is empty, free, or unused. Thus, the example cache 152 is not full because the entry 308 is available for use by additional information. The key field 310 specifies or identifies a name or identifier of a column in a table of the database 154 in the primary server computer system 100-1 and a value in that column that uniquely identifies a row in the database 154. The data field 312 comprises data from the row in the database that is identified by the key 310 in the same entry of the cache 152. The timestamp field 314 identifies the time and/or date at which the key 310 and/or the data 312 in the same entry in the cache 152 was last accessed (read or written) by the programs 150. The usage frequency field 316 specifies a count of a number of times that the key 310 and/or the data 312 in the same entry in the cache 152 were accessed (read or written) by the programs 150.

Figure 4:
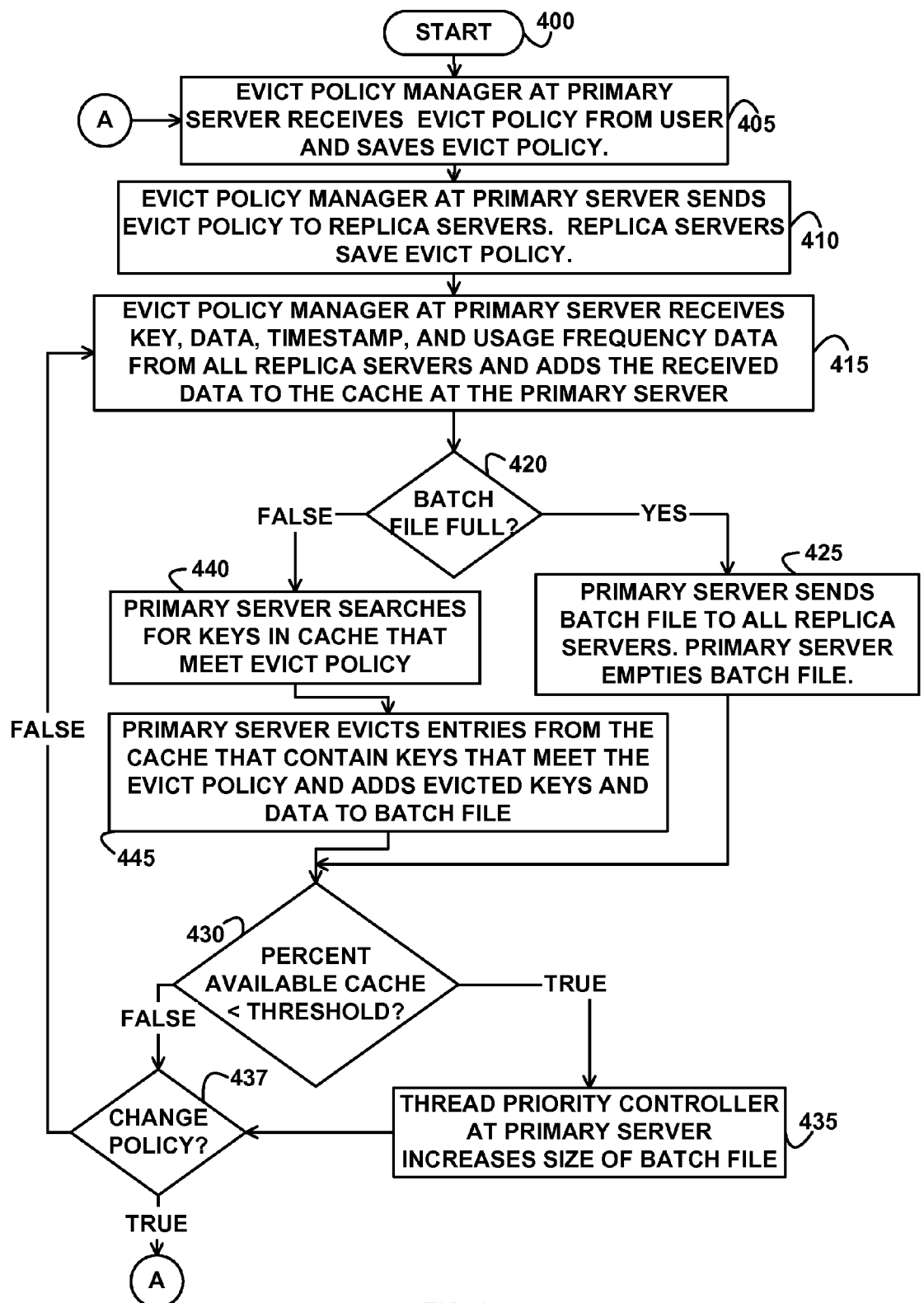
FIG. 4 depicts a flowchart of example processing for evicting keys at a primary server computer system, according to an embodiment of the invention.

FIG. 4 depicts a flowchart of example processing for evicting keys at a primary server computer system, according to an embodiment of the invention. In various embodiments, the logic of FIG. 4 executes periodically or continuously at the primary server computer system 100-1. In an embodiment, the logic of FIG. 4 executes concurrently with the logic of FIGS. 5, 6, and 7. Control begins at block 400. Control then continues to block 405 where the evict policy manager 150-1 at the primary server computer system 100-1 receives an evict policy 158 from a user and stores the evict policy 158 in the memory 102. In another embodiment, the primary server computer system 100-1 receives the evict policy 158 from another program, from the network 130, or reads a default evict policy 158 from the memory 102. Control then continues to block 410 where the evict policy manager 150-1 at the primary server computer system 100-1 sends the evict policy 158 to the replica server computer systems 100-2 and 100-3. The replica server computer systems save the evict policy 158 to their respective memory. Control then continues to block 415 where the evict policy manager 150-1 at the primary server computer system 100-1 receives the key, data, timestamp, and usage frequency information from all of the replica server computer systems (if the replica server computer systems have sent the information) and stores the key, data value, timestamp, and usage frequency information to new entries in the cache 152-1 at the primary server computer system 100-1 or updates pre-existing entries in the cache 152-1 with the received timestamp and usage frequency data, in those pre-existing entries in the cache 152-1 whose key and data values match the received key and data values. The key, data, timestamp, and usage frequency information received from the replica server computer systems are the entries that the replica server computer systems have added to or updated in their caches, as a result of processing read requests, as further described below with reference to FIG. 5. In an embodiment, the primary server may receive the key, data, timestamp, and usage frequency information from the replica servers at any time.

Control then continues to block 420 where the evict policy manager 150-1 at the primary server determines whether the batch file 156 is full and has no more free memory or storage available for the storing of additional entries. If the determination at block 420 is true, then the batch file 156 is full, so control continues to block 425 where the primary server computer system 100-1 sends the batch file 156 to all of the replica server computer systems and empties or erases the contents of the batch file 156, which causes the batch file 156 to now have memory available for new entries. The batch file 156 requests the replica servers to evict or delete entries from their respective caches that comprise keys that match (are identical to) the keys in the batch file 156. Control then continues to block 430 where the thread priority controller 150-7 at the primary server computer system 100-1 determines whether the amount or percentage of the cache 152-2 at the primary server computer system 100-1 that is available, unused, or free is less than a threshold amount or percentage. In an embodiment, the threshold amount or percentage of memory is specified by a user or by one of the programs 150.

If the determination at block 430 is true, then the amount or percentage of the available, unused, or free memory in the cache 152-1 at the primary server computer system 100-1 is less than a threshold percentage or amount of memory, so control continues to block 435 where the thread priority controller 150-7 at the primary server computer system 100-1 increases the size of, or allocates additional available memory to, the batch file 156-1 at the primary server computer system 100-1. In an embodiment, the thread priority controller determines the amount of additional memory to allocate by using a fixed predetermined amount, by using an amount specified by a user, by using a percentage of the amount of memory currently allocated to the cache, by using a percentage of the memory available to the thread priority controller 150-7 for allocation, or by any other appropriate technique. Increasing the size of the batch file 156-1 causes the batch file 156-1 to become full less frequently and causes the primary server 100-1 to send the batch file 156-1 to the replica servers (at block 425) less often.

Control then continues to block 437 where the primary server computer system 100-1 determines whether a new evict policy is available. If the determination at block 437 is true, then a new evict policy is available, so control returns to block 405 where the primary server receives the new evict policy and replaces the previous evict policy with the new evict policy. Control then continues block 410, as previously described above. If the determination at block 437 is false, then a new evict policy is not available, so control returns to block 415, as previously described above. If the determination at block 430 is false, then the percentage or amount of the available, unused, or free memory in the cache 152-1 at the primary server computer system 100-1 is greater than or equal to the threshold percentage or amount of memory, so control continues to block 437, as previously described above, without changing the size of the batch file 156-1. If the determination at block 420 is false, then the batch file 156-1 is not full and has available memory locations for the adding of entries, so control continues to block 440 where the evict policy manager 150-1 at the primary server computer system 100-1 searches for keys 310 in entries in the cache 152-1 at the primary server computer system 100-1 that meet or satisfy the eviction policy 158. Control then continues to block 445 where the evict policy manager 150-1 at the primary server computer system 100-1 evicts or deletes the entries from the cache 152 at the primary server computer system 100-1 that contain keys that meet the eviction policy and adds the removed keys 310 and data 312 to the batch file 156-1. Control then continues to block 430, as previously described above without sending the batch file 156-1 to the replica server computer systems because the primary server has not determined the batch file 156-1 to be full.

Figure 5:
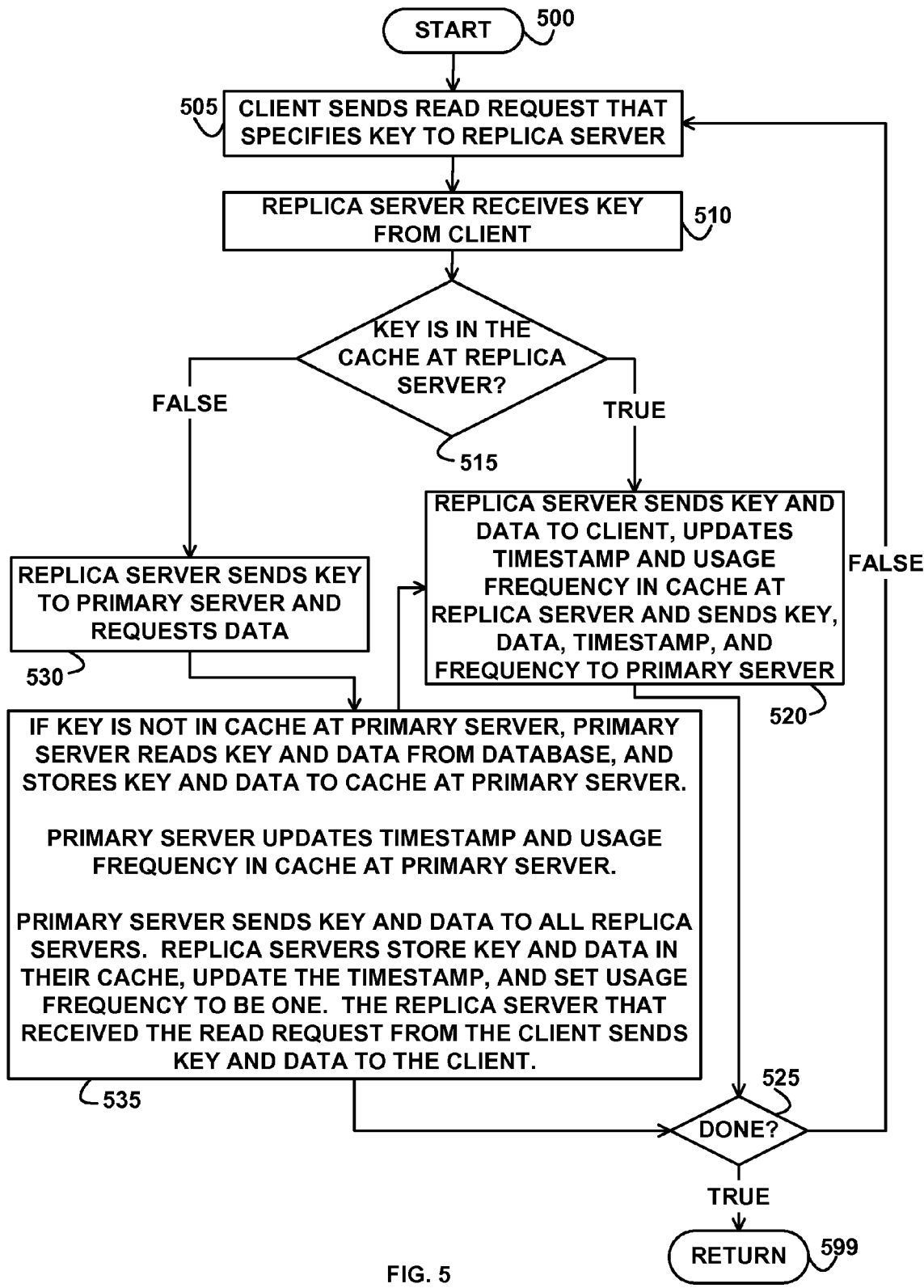
FIG. 5 depicts a flowchart of example processing for a read request at a replica server computer system, according to an embodiment of the invention.
Figure 6:
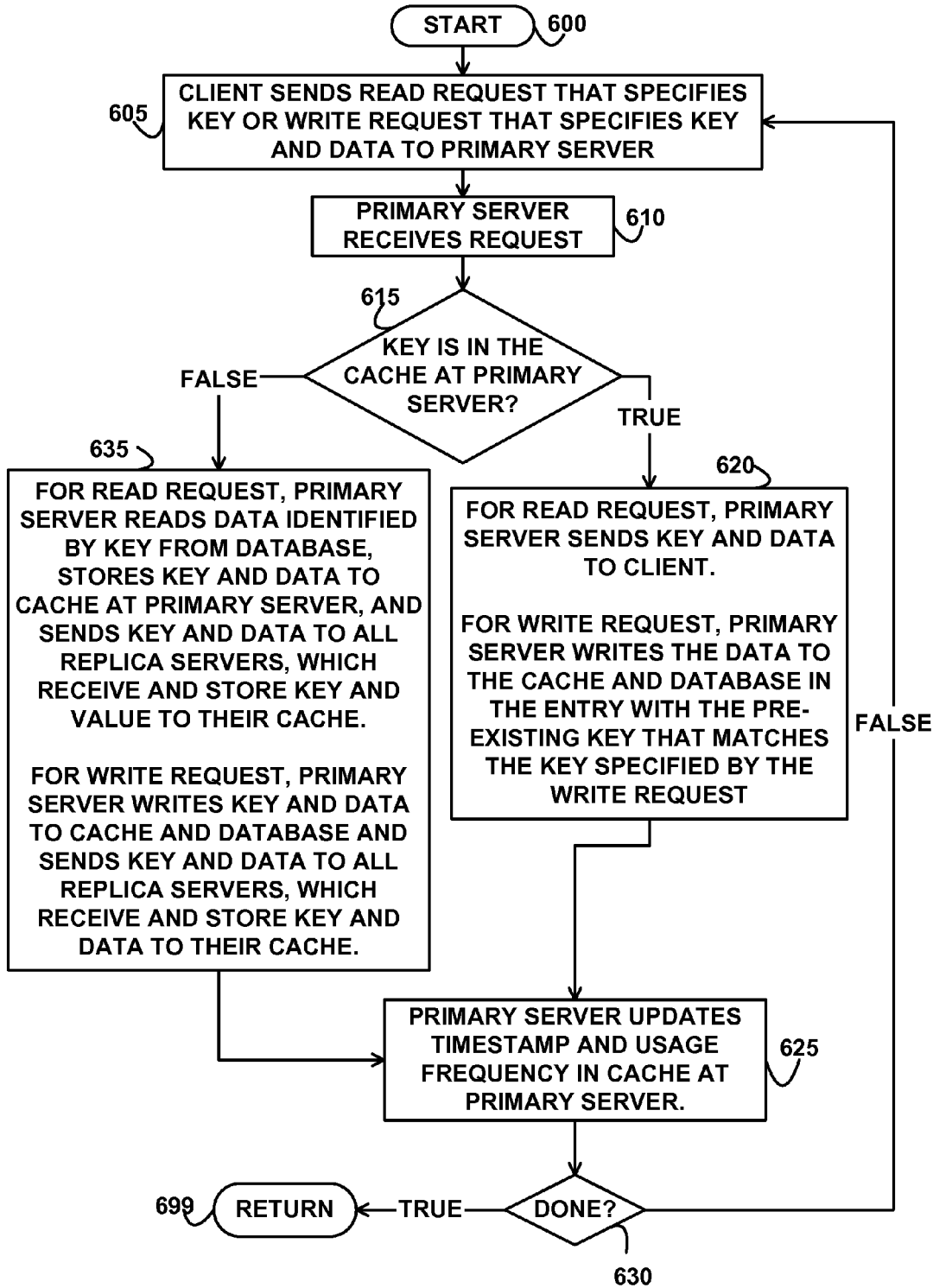
FIG. 6 depicts a flowchart of example processing for read and write requests at a primary server computer system, according to an embodiment of the invention.

Because the loops that start at block 405 and 415 may execute multiple iterations before the primary server computer system 100-1 sends the batch file 156-1 to the replica servers at block 425 and because the logic of FIG. 4, which evicts entries from the primary server cache, executes concurrently with the logic of FIGS. 5 and 6, which add and update entries in the primary server cache, the evicted entries in the batch file 156 may have satisfied the evict policy 158 at different times (at different time ranges during which the different iterations of the loops execute) and may have satisfied different evict policies. For example, the batch file 156 may comprise entries that comprise one, some, or all of the keys K1, K2, K3, and K4 where: the primary server evicted the key K1 from the primary server cache 152-1 for satisfying the evict policy EP1 during a time range T1 of a first iteration of the loop that starts at block 415; the primary server evicted the key K2 from the primary server cache 152-1 for satisfying the evict policy EP1 at a time T2 (a later time range than the time range T1 during which a later iteration of the loop executes), and the primary server did not evict the key K2 during the time range T1 because, although the key K2 was present in the primary server cache 152-1 during the time range T1, the primary server determined that the key K2 did not satisfy the evict policy EP1 during the time range T1; the primary server evicted the key K3 from the primary server cache 152-1 for satisfying the evict policy EP1 during a time range T3 (a later time range and a later iteration than the time range T2), and the key K3 was not present in the primary server cache 152-1 at one or both of the time ranges T1 and T2, so the primary server did not evict the key K3 during the time ranges T1 and T2; and the primary server evicted the key K4 from the primary server cache 152-1 for satisfying an evict policy EP2 during a time range T4 (a later time range and a later iteration than the time range T3), and the primary server did not evict the key K4 during the time ranges T1, T2, and T3 because although the key K4 was present in the primary server cache 152-1 at some or all of the time ranges T1, T2, and T3, the primary server determined that the key K4 did not satisfy the evict policy EP1 during the time ranges that the key K4 was present in the primary server cache 152-1.

FIG. 5 depicts a flowchart of example processing for a read request at a replica server computer system, according to an embodiment of the invention. Control begins at block 500. Control then continues to block 505 where the application 150-14 or 150-15 executing on a respective processor at the respective client computer system 100-4 or 100-5 sends a read request that specifies key to the replica server computer system 100-2 or 100-3. The read request may also comprise identifiers of the database 154 and a table within the database 154. Control then continues to block 510 where the replica server receives the read request that specifies a received key from the client computer system. Control then continues to block 515 where, in response to, and as result of, the replica server receiving the read request, the replica server determines whether the received key is contained in the cache 152 at the replica server. That is, the replica server compares the received key to the keys in the cache 152 at the replica server and determines if the received key matches (is identical to) any of the keys in the cache 152 at the replica server.

If the determination at block 515 is true, then the received key is stored in the cache 152 at the replica server, so control continues to block 520 where the replica server reads the data identified by received key from the cache 152 at the replica server and sends the received the received key and data read from the cache 152 to the client computer system that sent the read request. The replica server further writes the current time into the timestamp of the entry in the cache 152 at the replica server that matches the received key and increments the usage frequency in the entry. The replica server further sends the received key, the read data, the updated timestamp, and the incremented usage frequency to the primary server computer system 100-1. (The primary server computer system 100-1 receives the received key, the read data, the updated timestamp, and the incremented usage frequency as previously described above with reference to FIG. 4). Since the received key and data identified by the key was in the cache at the replica server, the replica server does not request the data identified by the received key from the primary server. Control then continues to block 525 where the replica server determines whether the replica server is done receiving requests from the client computer systems 100-4 and 100-5. If the determination at block 525 is true, the replica server is done receiving requests from the client computer systems, so control continues to block 599 where the logic of FIG. 5 returns.

If the determination at block 525 is false, then the replica server is not done receiving requests from the client computer systems 100-4 and 100-5, so control returns to block 505 where the same or a different client computer system sends a read request specifying the same or a different received key to the replica server computer system, as previously described above. If the determination at block 515 is false, then the received key is not contained in the cache 152 at the replica server, so control continues to block 530 where the replica server sends a request to the primary server computer system 100-1 that comprises the received key and requests to receive the data in the database identified by the received key. Control then continues to block 535 where the primary server computer system 100-1 receives the request that specifies the received key from the replica server and, in response, the primary server computer system 100-1 determines whether the received key is in the cache 152-1 at the primary server computer system 100-1. That is, the primary server compares the received key to the key field 310 in the entries in the cache 152-1 and determines whether they are identical.

If the received key is not in the cache 152-1 at the primary server computer system 100-1, then the primary server computer system 100-1 finds a row in the database 154 with a key that matches the received key, reads the data in that matching row from the database 154, and stores the received key and the read data into the cache 152-1 at the primary server computer system 100-1. The primary server 100-1 further sets the timestamp in the entry in the cache 152 that contains the received key to be the current time and updates the usage frequency in the entry. If the primary server computer system 100-1 read the data identified by the key from the database 154, then the primary server computer system 100-1 sets the usage frequency in the entry in the cache 152-1 to be one. If the primary server computer system 100-1 did not read the data value from the database 154 because the received key and identified data were pre-existing in the cache 152-1, then the primary server computer system 100-1 increments the usage frequency in the cache 152-1. The primary server computer system 100-1 then sends the received key and data (either read from the database 154 and stored in the cache 152-1 or read from the pre-existing data and matching key in the cache 152-1) to all replica servers. The replica server computer systems receive and store the key and data in entries in their respective caches, update their timestamps to the current time, and set the usage frequency in the cache 152 for the entries to be one. The replica server computer system that received the request (from the client computer system at block 505) sends the key and data to the client computer system that sent the read request. Control then continues to block 525, as previously described above.

FIG. 6 depicts a flowchart of example processing for read and write requests at a primary server, according to an embodiment of the invention. Control begins at block 600. Control then continues to block 605 where the client computer system sends a read request that specifies a key or a write request that specifies a key and data to the primary server computer system 100-1. The requests may also comprise identifiers of a database and a database table. Control then continues to block 610 where the primary server computer system 100-1 receives the read or write request from the client computer system. Control then continues to block 615 where, in response to and as result of the primary server computer system 100-1 receiving the read or write request, the primary server computer system 100-1 determines whether the received key is contained in the cache 152-1 at the primary server computer system 100-1. That is, the primary server 100-1 compares the received key to the keys 310 in the cache 152 and determines if the received key matches (is identical to) any of the keys 310 in any of the entries in the cache 152-1.

If the determination at block 615 is true, then the received key is contained in the cache 152-1 at the primary server computer system 100-1, so control continues to block 620 where, for a read request, the primary server computer system 100-1 sends the received key and data read from the entry in the cache 152-1 that matched the received key to the client computer system that sent the read request. For a write request, the primary server computer system 100-1 writes the received data into the data 312 in the entry in the cache 152-1 that contains the key that matches the received key and also writes the data into the database 154 in an entry that contains a pre-existing key that matches the received key specified by the write request. Control then continues to block 625 where the primary server computer system 100-1 writes the current time into the timestamp field 314 of the cache entry with the key field 310 that matches the received key and increments the usage frequency 316 in that entry in the cache 152-1 at the primary server 100-1.

Control then continues to block 630 where the primary server computer system 100-1 determines whether the primary server 100-1 is done receiving requests from the client computer systems 100-4 and 100-5. If the determination at block 630 is true, then the primary server is done receiving requests from the client computer systems 100-4 and 100-5, so control continues to block 699 where the logic of FIG. 6 returns. If the determination at block 630 is false, then the primary server computer system 100-1 is not done receiving requests from the client computer systems 100-4 and 100-5, so control returns to block 605 where the same or a different client computer system sends a read or write request specifying the same or a different key and optional data to the primary server computer system 100-1, as previously described above. If the determination at block 615 is false, then the received key is not contained in the cache 152-1 at the primary server computer system 100-1, so control continues to block 635. If the received request is a read request, then the primary server computer system 100-1 reads the data from the row identified by the received key from the database 154, stores the received key and read data into the cache 152-1 at the primary server computer system 100-1, and sends the received key and read data to all replica servers, which receive and store the key and data to entries in their respective caches and update their timestamp and usage frequency information for the entry. If the received request is a write request, then the primary server computer system 100-1 writes the received key and the received data to the cache 152-1 and to the database 154 at the primary server computer system 100-1 and sends the received key and the received data to all replica servers, which receive and store the received key and the received data to their respective caches and update their respective timestamp and usage frequency information.

Control then continues to block 625 where the primary server updates the timestamp and usage frequency information in the entry in the cache 152-1 at the primary server 100-1 that contains a key that matches the key specified by the received read or write request, as previously described above.

Figure 7:
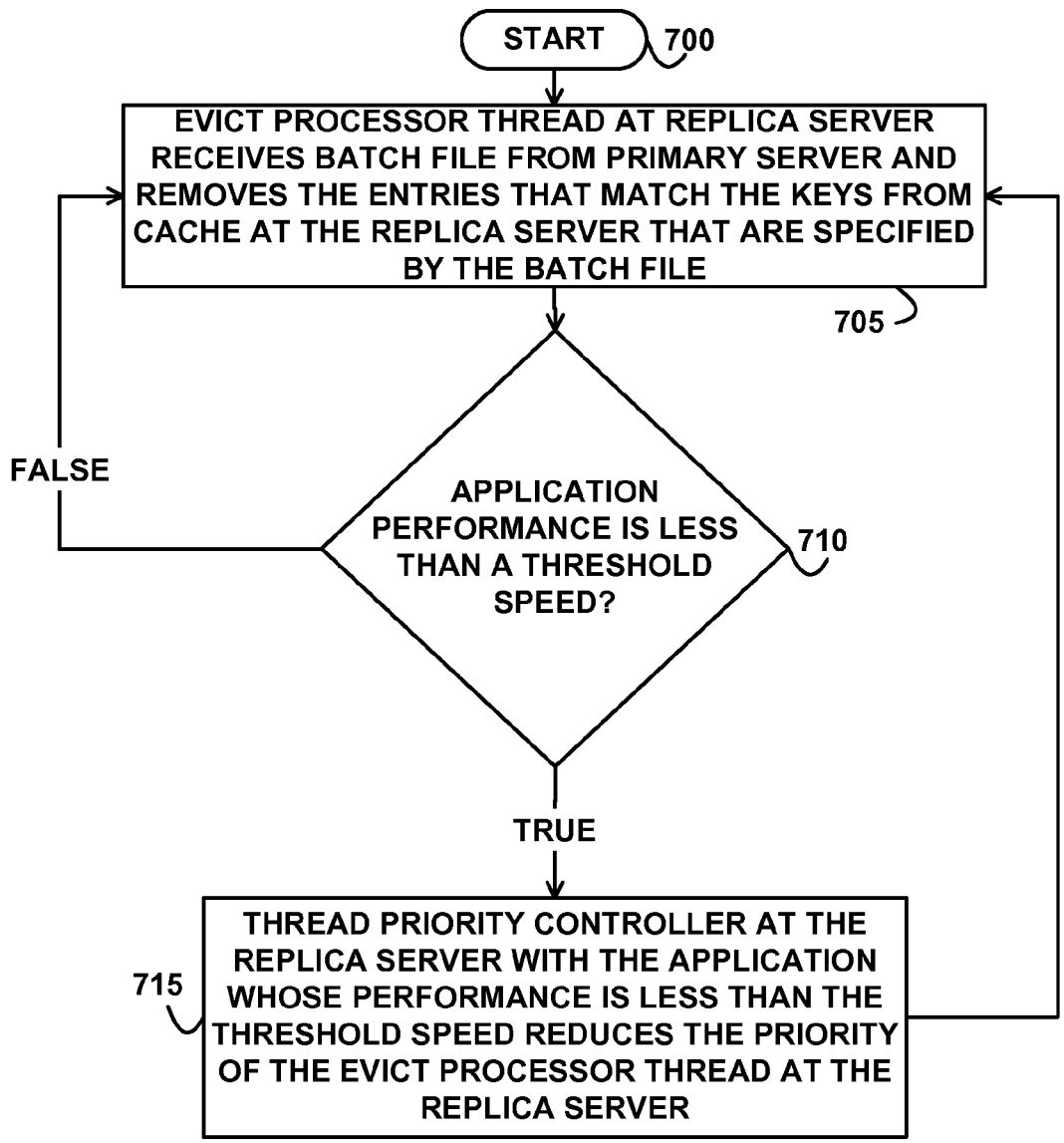
FIG. 7 depicts a flowchart of example processing for evicting keys at a replica server computer system, according to an embodiment of the invention.

FIG. 7 depicts a flowchart of example processing for evicting keys from a cache at a replica server, according to an embodiment of the invention. The logic illustrated by FIG. 7 is performed by each replica server. Control begins at block 700. Control then continues to block 705 where the evict processor thread 150-9 or 150-12 executing at the replica server 100-2 or 100-3 receives the batch file 156 from the primary server computer system 100-1 and removes the entries from the cache 152 at the replica server that contain keys that match the keys specified by the received batch file 156. Control then continues to block 710 where the thread priority controller 150-10 or 150-11 at the replica server determines whether the performance of applications 150-8 or 150-11 that execute at the replica server is less than a threshold speed. In various embodiments, the threshold speed is specified by a user or by one of the programs 150. If the determination at block 710 is true, then the application performance at the replica server is less than the threshold speed, so control continues to block 715 where the thread priority controller 150-10 or 150-11 executing at the replica server with the application whose performance is lower than the threshold speed reduces the priority of the execution of the evict processor thread 150-9 or 150-12 at that replica server. Reducing the priority of the execution of the evict processor thread 150-9 or 150-12 causes the evict processor thread 150-9 or 150-12 to receive fewer processor cycles or less execution time, so that the evict processor thread 150-9 or 150-12 executes slower, which causes the processor at the replica server to allocate more execution time to the execution of the applications 150-8 or 150-11 at the replica server. Control then returns to block 705, as previously described above.

If the determination at block 710 is false, then application performance at the replica server is greater than or equal to the threshold speed, so control returns to block 705, as previously described above, without reducing the priority of the evict processor thread 150-9 or 150-12.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   evicting a plurality of keys from a first cache at a primary server, wherein the evicting further comprises evicting a first key of the plurality of keys from the first cache because the first key satisfied a first evict policy during a first time range and evicting a second key of the plurality of keys from the first cache because the second key satisfied the first evict policy during a second time range, wherein the second key did not satisfy the first evict policy during the first time range;
   adding the plurality of keys to a batch file;
   if the batch file is full, sending the batch file to a replica server, wherein the batch file requests the replica server to evict the plurality of keys from a second cache at the replica server, wherein the plurality of keys are a subset of a database that is stored at the primary server, wherein the database is not stored at the replica server;
   allocating additional memory to the batch file if a percentage of the first cache that is available is less than a threshold amount; and
   if the batch file is not full, refraining from sending the batch file to the replica server.

2. The method of claim 1, wherein the evicting further comprises:
   evicting a third key of the plurality of keys from the first cache because the third key satisfied the first evict policy during a third time range, wherein the third key was not present in the first cache during the first time range.

3. The method of claim 2, wherein the third key was not present in the first cache during the second time range.

4. The method of claim 2, wherein the evicting further comprises:
   evicting a fourth key of the plurality of keys from the first cache because the fourth key satisfied a second evict policy during a fourth time range, wherein the fourth key did not satisfy the first evict policy during the third time range.

5. The method of claim 1, further comprising:
   erasing contents of the batch file after the sending.

6. A non-transitory computer-readable storage medium encoded with instructions, wherein the instructions when executed comprise:
   evicting a plurality of keys from a first cache at a primary server, wherein the evicting further comprises evicting a first key of the plurality of keys from the first cache because the first key satisfied a first evict policy during a first time range and evicting a second key of the plurality of keys from the first cache because the second key satisfied the first evict policy during a second time range, wherein the second key did not satisfy the first evict policy during the first time range;
   adding the plurality of keys to a batch file;
   if the batch file is full, sending the batch file to a replica server, wherein the batch file requests the replica server to evict the plurality of keys from a second cache at the replica server, wherein the plurality of keys are a subset of a database that is stored at the primary server, wherein the database is not stored at the replica server;
   allocating additional memory to the batch file if a percentage of the first cache that is available is less than a threshold amount; and
   if the batch file is not full, refraining from sending the batch file to the replica server.

7. The non-transitory computer-readable storage medium of claim 6, wherein the evicting further comprises:
   evicting a third key of the plurality of keys from the first cache because the third key satisfied the first evict policy during a third time range, wherein the third key was not present in the first cache during the first time range.

8. The non-transitory computer-readable storage medium of claim 7, wherein the third key was not present in the first cache during the second time range.

9. The non-transitory computer-readable storage medium of claim 7, wherein the evicting further comprises:
   evicting a fourth key of the plurality of keys from the first cache because the fourth key satisfied a second evict policy during a fourth time range, wherein the fourth key did not satisfy the first evict policy during the third time range.

10. The non-transitory computer-readable storage medium of claim 6, further comprising:
    erasing contents of the batch file after the sending.

11. A primary server computer system, comprising:
a processor; and
memory communicatively coupled to the processor, wherein the memory is encoded with instructions that when executed on the processor comprise:
    evicting a plurality of keys from a first cache at the primary server computer system, wherein the evicting further comprises evicting a first key of the plurality of keys from the first cache because the first key satisfied a first evict policy during a first time range and evicting a second key of the plurality of keys from the first cache because the second key satisfied the first evict policy during a second time range, wherein the second key did not satisfy the first evict policy during the first time range,
    adding the plurality of keys to a batch file,
    allocating additional memory to the batch file if a percentage of the first cache that is available is less than a threshold amount,
    if the batch file is full, sending the batch file to a replica server, wherein the batch file requests the replica server to evict the plurality of keys from a second cache at the replica server, wherein the plurality of keys are a subset of a database that is stored at the primary server computer system, wherein the database is not stored at the replica server, and
    if the batch file is not full, refraining from sending the batch file to the replica server.

12. The primary server computer system of claim 11, wherein the evicting further comprises:
    evicting a third key of the plurality of keys from the first cache because the third key satisfied the first evict policy during a third time range, wherein the third key was not present in the first cache during the first time range.

13. The primary server computer system of claim 12, wherein the third key was not present in the first cache during the second time range.

14. The primary server computer system of claim 12, wherein the evicting further comprises:
    evicting a fourth key of the plurality of keys from the first cache because the fourth key satisfied a second evict policy during a fourth time range, wherein the fourth key did not satisfy the first evict policy during the third time range.

15. The primary server computer system of claim 11, wherein the instructions further comprise:
    erasing contents of the batch file after the sending.

* * * * *